United States Patent [19]

Gebhard

[11] 3,967,342
[45] July 6, 1976

[54] SUSPENDED SWIVEL WHEEL ARRANGEMENT FOR BABY CARRIAGES AND THE LIKE

[75] Inventor: Albert W. Gebhard, Boulder, Colo.

[73] Assignee: Gerico, Inc., Boulder, Colo.

[22] Filed: Jan. 13, 1975

[21] Appl. No.: 540,320

[52] U.S. Cl. .................................... 16/48; 16/29
[51] Int. Cl.² ........................................ B60B 33/00
[58] Field of Search ............ 16/18 R, 18 B, 47, 48, 16/22, 23, 29, 37, 38; 280/36 B, 39, 79.1

[56] References Cited
UNITED STATES PATENTS

| 2,880,011 | 3/1959 | Peterson ............................ 280/36 B |
| 3,390,893 | 7/1968 | MacLaren ............................ 280/39 |
| 3,736,021 | 5/1973 | MacLaren ............................ 280/39 X |
| 3,869,105 | 3/1975 | Daniels ............................ 16/18 R X |

FOREIGN PATENTS OR APPLICATIONS

| 2,001,133 | 1/1970 | Germany ............................ 16/38 |
| 610,101 | 10/1948 | United Kingdom ............................ 16/38 |

Primary Examiner—Werner H. Schroeder
Assistant Examiner—Moshe I. Cohen
Attorney, Agent, or Firm—Reilly and Hancock

[57] ABSTRACT

Tandem wheels mounted on a common axle are connected to a movable vehicle such as a baby carriage, stroller, wheelchair or the like in a configuration which permits maximum stability and freedom of motion. The axis of the wheels is pivotally attached and offset in trailing relation to and on opposite sides of the mounting spindle with an intermediary shock cushioning arrangement. The spindle has a common shaft with a lower section arranged to provide an interfacing shoulder to a rotatably mounted upper section. The upper section includes means for attachment to the vehicle frame.

6 Claims, 4 Drawing Figures

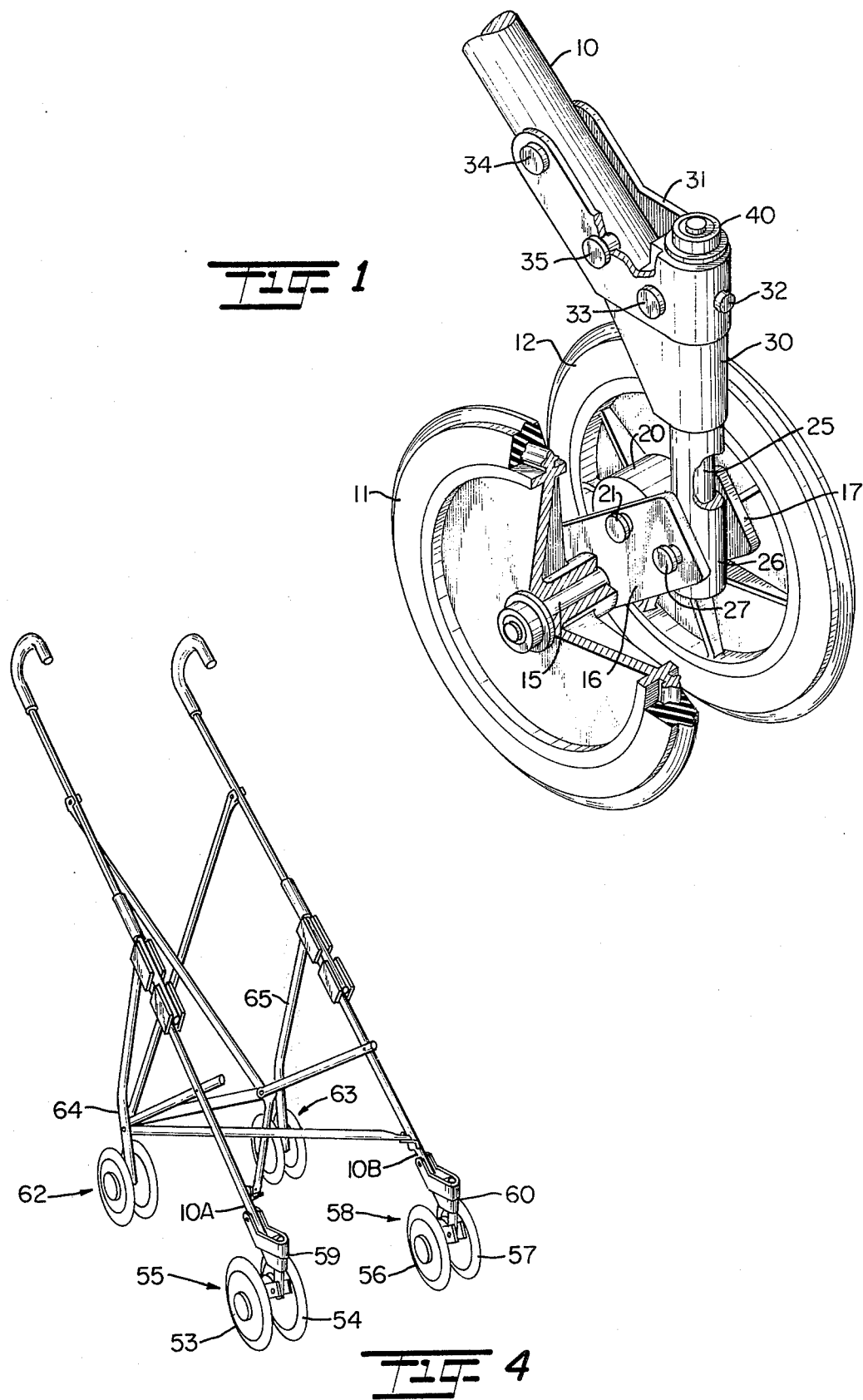

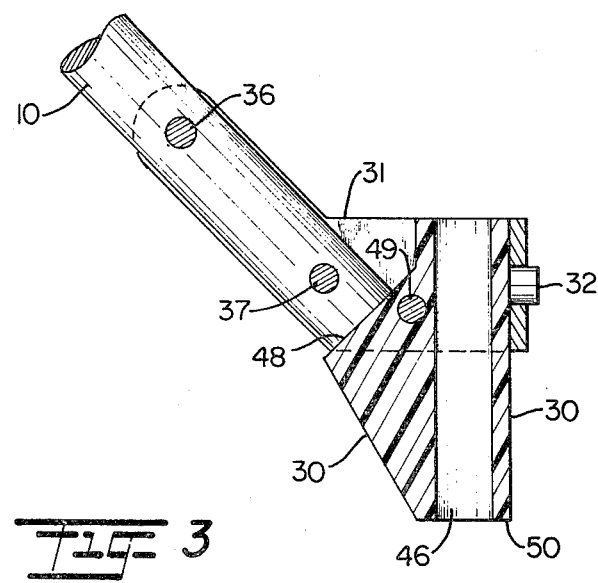
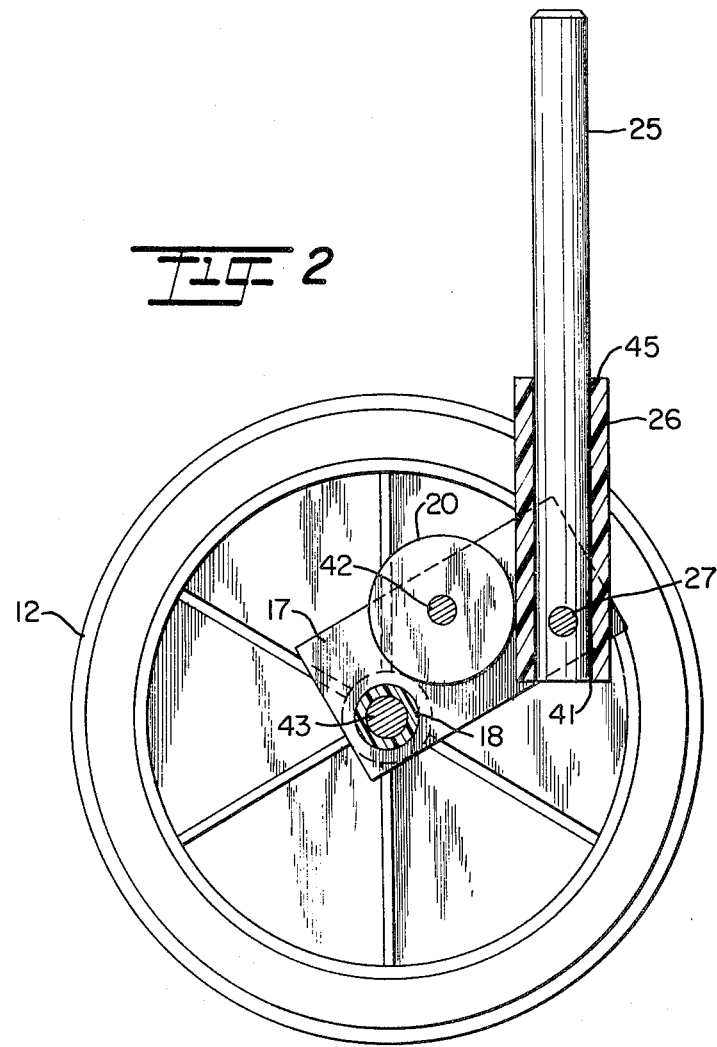

SUSPENDED SWIVEL WHEEL ARRANGEMENT FOR BABY CARRIAGES AND THE LIKE

CROSS REFERENCE TO RELATED APPLICATIONS

Copending application Ser. No. 480,153 entitled FOLDABLE CANOPY FOR BABY CARRIAGES by A. W. Gebhard, which was filed on June 17, 1974, now U.S. Pat. No. 3,917,302, and assigned to the same assignee of this application shows the general structure of a baby carriage which can advantageously utilize the suspension apparatus of this invention.

BACKGROUND OF THE INVENTION

Apparatus for mounting wheels on movable vehicles for relatively light loads such as baby carriages, strollers, carts of various sorts, wheelchairs, and the like have typically employed single wheel mounts with U-shaped brackets for attachment to the axle of the wheel and rotary attachment to the vehicle frame. However, such arrangements suffer from several disadvantages. For instance, attempts to turn the vehicle in a direction perpendicular to the orientation of the wheel tends to tip the wheel sideways rather than to effect turning. Further, such single wheel arrangements tend to track poorly while in motion and must be arranged on an extended wheel base if adequate balancing is to be provided in many situations. The mounting assembly where the wheel is attached to the vehicle frame typically requires ball bearing mounts which frequently become rusted or clogged because of the nature of their usage. Still further, the single wheel arrangements do not readily adapt to uneven surfaces.

Double wheel arrangements have generally been suggested for such vehicles, one such system being shown in my copending application cross-referenced above. This has improved the balance and tracking as well as the stability of such vehicles. A relatively simple shock absorber arrangement has likewise been developed wherein the mounting tube of the vehicle frame impinges on a resilient pad in a coupling between it and the wheel axle, one example of such an arrangement being shown in U.S. Pat. No. 3,390,893. However, there has been a continuing need for a reliable wheel suspension apparatus for light-load carrying vehicles which is easily fabricated from low cost elements but which provides maximum adaptability to turning forces or surface variations.

SUMMARY OF THE INVENTION

The present invention relates to apparatus for swivel suspension mounting of wheels to relatively light load carrying vehicles. More particularly, the present invention is concerned with an arrangement for attaching mounting wheels to baby carriages and the like in a manner which permits maximum response to any turning movement without tipping while still providing maximum balance and tracking during movement and standing of the vehicle. The present invention can be fabricated from relatively low-cost components and the combination permits extended long term usage without degradation of the suspension apparatus.

In general, this invention is a combination of elements for pivotally attaching a frame of a movable vehicle to a dual wheel arrangement via a simple shock absorber configuration. The invention uses a common vertical spindle arrangement which has an intermediate shoulder for rotatably attaching a sleeve so that the entire spindle and wheel assembly can rotate about the axis of the spindle. The double wheel axle is offset and in trailing relation to the axis of the spindle; and further the dual wheels are mounted on opposite sides of the spindles. This permits the dual wheels to automatically adjust to minor variations of the ground surface and also to present less resistance to turning in a direction perpendicular to the orientation of the wheels at any given moment. The vehicle wheel base need not be extended for the same degree of balance as single wheeled vehicles, and bearings which can be subject to rust or clogging are avoided thereby extending the life of the suspension apparatus.

It is an object of the present invention to provide apparatus for mounting wheels pivotally to a light load bearing vehicle.

A further object of this invention is to provide a suspension apparatus for a dual wheel configuration to a light load carrying movable vehicle such as a baby carriage or the like.

A still further object of this invention is to provide suspension apparatus for a light load bearing movable vehicle with this apparatus being composed of low cost components in a configuration well-suited for long term reliable usage.

Another object of this invention is to provide a dual wheel suspension apparatus for a movable vehicle in such a manner that the wheel suspension apparatus will respond to any turning movement while providing maximum stability and tracking as well as adaptability to uneven surfaces.

The foregoing and other objects, features and advantages of the present invention will become more readily apparent in view of the preferred embodiment described below.

BRIEF DESCRIPTION OF THE DRAWINGS

FIG. 1 is a perspective view of the dual wheel suspension apparatus in accordance with the present invention with some elements shown partially in section.

FIG. 2 shows a plan view of the spindle showing its attachment to the mounting plates, shock absorber and wheels.

FIG. 3 is a plan view of the upper sleeve section of this invention in relation to its mounting bracket and vehicle frame.

FIG. 4 shows a typical dual wheel mounting arrangement for a stroller.

DETAILED DESCRIPTION OF THE PREFERRED EMBODIMENT

As shown in FIG. 1, tubular member 10 of a light load carrying vehicle is attached by means of the present invention to a pair of wheels 11 and 12. These wheels are each rotatably attached to axle 15. Mounting plates or arms 16 and 17 are also rotatably attached to axle 15 at one end and are retained in spaced relation on axle 15 by means of intermediate collar 18 (note FIG. 2). Thus, wheels 11 and 12 are free to rotate relative to plates 16 and 17.

Plates 16 and 17 retain a ring of flexible material 20 mounted therebetween on pin 21. A spindle assembly which comprises central shaft 25 and a lower sleeve 26 are both rotatably attached to plates 16 and 17 by pin 27. Thus, lower sleeve 26 rests against the resilient pad of flexible ring 20 which accordingly restricts the amount of actual rotation about pin 27 while providing a degree of shock absorber operation. The spindle assembly is completed by upper sleeve 30 which has an essentially U-shaped bracket 31 attached thereto by means of stub pin 32 which extends from sleeve 30 [note FIG. 3] through U-bracket 31 and a fastening arrangement such as a rivet is attached at 33 to complete the attachment of U-member 31 to sleeve 30. Additional fastening rivets 34 and 35 complete the attachment of bracket 31 to vehicle frame member 10. A fastener cap 40 holds the entire upper sleeve 30 on the central shaft 25.

FIG. 2 shows the lower spindle assembly and its interrelation to the shock absorber apparatus. More particularly, central shaft 25 passes through sleeve 26 and can be upset in a cap configuration at end 41 to assist in retaining sleeve 26 in place. However, mounting pin or rivet 27 passes completely through both plates 16 and 17 as well as shaft 25 and sleeve 26. The flexible ring or grommet 20 is fixed between plates 16 and 17 via mounting pin 21 [FIG. 1] passing through bore 42. Ring 20 engages sleeve 26 so as to limit the amount of pivotal rotation thereof around pin 27. Hole 43 passes through the other end of plate 17 and aligns with the bore through collar or sleeve 18 and a counterpart hole in plate 16 [not shown in FIG. 2] to rotatably accept axle 15. Preferably the spindle shaft 25 is made of steel while the lower sleeve 26 is fabricated from a durable plastic such as a molded polycarbonate material. Sleeve 26 thus provides a bearing surface or shoulder 45.

FIG. 3 shows the upper spindle sleeve 30 which has bore 46 therethrough so that sleeve 30 can be rotatably mounted on the upper end of shaft 25. Further, sleeve 30 has a sloped bearing surface 48 and a hole 49, the latter accepting mounting rivet 33 shown in FIG. 1. Thus, the end of vehicle frame element 10 typically abuts shoulder 48 and imparts the weight therefrom at an angle relative to the axis of shaft 25. As is further evident from FIGS. 1 and 3, rivets 34 and 35 actually retain the tube 10 in position by passing through holes 36 and 37, respectively, which extend through both arms of U-bracket 31 and tube 10. Thus the weight associated with tubular member 10 is transferred through bracket 31 as well as shoulder 48 into upper sleeve 30. By fabricating sleeve 30 from a durable plastic such as molded polycarbonate materials, the weight bearing engagement between lower shoulder 50 of sleeve 30 and upper shoulder which is of sleeve 26 provides a quiet, reliable bearing configuration which is not subject to rust or binding from dirt. Further, the mounting of sleeve 30 on spindle shaft 25 is substantially secured in isolation from any further dirt by cap 40 [FIG. 1] thereby permitting relatively free rotation between these elements.

The offset relation to the axis of spindle shaft 25 relative to the axis of axle 15 and the rotatable mount of sleeve 30 on spindle shaft 25 permits the wheels 11 and 12 to automatically adjust to uneven surfaces. In other words, the dual wheels 11 and 12 are disposed both rearwardly and laterally in offset relation to the spindle axis. Thus, if the wheels are arranged so that only wheel 11 is in contact with the surface while weight is applied from the vehicle and transferred vertically via the spindle assembly, an unbalance results which will cause spindle 25 to rotate permitting wheel 12 to turn until it likewise engages the surface. Such a response imparts no lateral motion to the vehicle but enhances its stability relative to the ground surface.

Still further, any turning movement applied to vehicle frame 10 including a moving force in a direction perpendicular to the orientation of wheels 11 and 12 will cause an immediate rotational response of the assembly so that it will align itself with the direction of movement without tipping and will thereafter continue to evenly track the surface over which the vehicle is being moved. The automatic adaptation to surface variation mentioned previously further enhances the balancing characteristics of the vehicle and its stability even when it is standing still. That is, the configuration permits some play in the various wheels of a baby carriage or the like so that all sets will rest on the ground. There is less resistance to turning because of this lateral offset and the apparatus provides a greater leverage in turning than has been previously available, this being realized without requiring any sacrifice of wheel base otherwise required by direct rearward extension of the wheel mounts.

FIG. 4 illustrates one prospective adaptation of the offset dual wheel mounting assembly to a baby stroller environment generally along the lines of that shown in copending application Ser. No. 480,153 now U.S. Pat. No. 3,917,302 by A. W. Gebhard. Dual wheel mount assemblies 55 and 58 each composed of the apparatus shown and described hereinbefore for FIGS. 1-3 are attached to the tubular frame members 10A and 10B. Spindles 59 and 60 are thus held in a vertical position and are offset relative to the mounting axles for wheel pairs 53-54 and 56-57, respectively. Further these wheel pairs established contact with the ground at two points which are likewise in offset relation to the axis of spindles 59 or 60. Because of the aforementioned offset relationships, placement of the stoller so that only one wheel of each pair is in contact with the ground will create a force imbalance which will effect rotation of the wheel pairs about their offset vertical spindle until the other wheel engages the ground surface. This same offset mount accommodates forces for turning the stroller in the direction laterally perpendicular to the planes of the wheels for assemblies 55 and 58 of FIG. 4. Although rear wheel assemblies 62 and 63 are shown as rigidly attached to rear frame members 64 and 65, they can be mounted by a shock absorber system similar to that described hereinbefore or by the offset spindle assembly similar to 55 and 58.

Although the present invention has been described in detail relative to the preferred embodiment, various modifications, changes and additions will be readily apparent to those having normal skill in the art without departing from the spirit of this invention.

What is claimed is:

1. Movable suspension apparatus for a wheeled vehicle comprising:
   a horizontal wheel axle,
   a pair of wheels rotatably mounted in spaced relation to one another on said axle,
   at least one arm rotatably mounted at one end on said axle inwardly of said wheels,
   a vertical mounting spindle having an upper and lower section, said lower section rotatably mounted to the other end of said arm and having an upper shoulder between said upper and lower sections,
   means mounted on said arm for resiliently restricting the rotation of said spindle relative to said arm, and
   sleeve means attached to the vehicle and rotatably mounted on said upper section of said spindle for applying the weight of said vehicle on said spindle shoulder and retaining said spindle in a substantially upright position, said sleeve means and at least said lower section of said vertical mounting spindle being constructed of durable materials having characteristics of low sliding friction therebetween and wherein said sleeve means has a bore therethrough for rotatably receiving said spindle upper section and which further includes a weight-transmitting surface sloped relative to the axis of said spindle, said apparatus further including means for attaching said vehicle to said sleeve means at said sloped surface.

2. Apparatus in accordance with claim 1 wherein said sleeve means and at least said lower section of said vertical spindle are constructed of polycarbonate materials, said resiliently restricting means being a flexible ring retained on a pin which is attached to said arm whereby said spindle lower section yieldingly engages said flexible ring.

3. Apparatus in accordance with claim 2 which includes a second arm rotatably mounted inwardly of said wheels in spaced relation to said one arm on said axle, said spindle lower section and said flexible ring both being mounted between said arms.

4. Apparatus in accordance with claim 1 wherein said sleeve means has a pin extending outwardly therefrom perpendicular to the axis of said sleeve bore and on the side of the axis of said sleeve bore opposite said sloped weight-transmitting surface, and said attaching means includes a U-shaped member having a hole at the apex thereof for receiving said pin and means for retaining the arms of said U-shaped member to said sleeve means and the vehicle.

5. Suspension apparatus for a vehicle which has a tubular attaching member comprising:
an axle,
a pair of wheels rotatably mounted on said axle,
a pair of elongated plates each rotatably attached at one end to said axle between said wheels,
a spacer on said axle between said plates,
a spindle assembly including first and second sleeves and a shaft, said first sleeve and said shaft being rotatably attached between the other ends of said plates with said first sleeve over said shaft so as to define a lower section,
a resilient ring mounted between said plates intermediate the ends thereof for yieldably engaging said first sleeve,
said second sleeve being rotatably mounted on said shaft in abutting relation to said first sleeve, said second sleeve including a weight-transmitting surface which is sloped relative to the axis of said shaft, and
means for attaching said second sleeve to the vehicle tubular attaching member so that said spindle assembly is retained in a substantially upright position with the axis of said spindle assembly perpendicular to the axis of said axle but offset therefrom, said attaching means retaining the vehicle tubular attaching member in abutting relation to said second sleeve sloped surface.

6. Apparatus in accordance with claim 5 wherein said second sleeve has a stub extending horizontally therefrom on the side of the axis of said shaft opposite said weight-transmitting surface, said attaching means including a bracket having a central portion conforming to the surface of said second sleeve with a bore therethrough for receiving said stub and a pair of parallel arms extending from said central portion for retaining said vehicle tubular attaching member relative to said second sleeve.

* * * * *